INVENTOR.
ELMER J. LEMASTER
BY
Jerome R. Cox
ATTORNEY

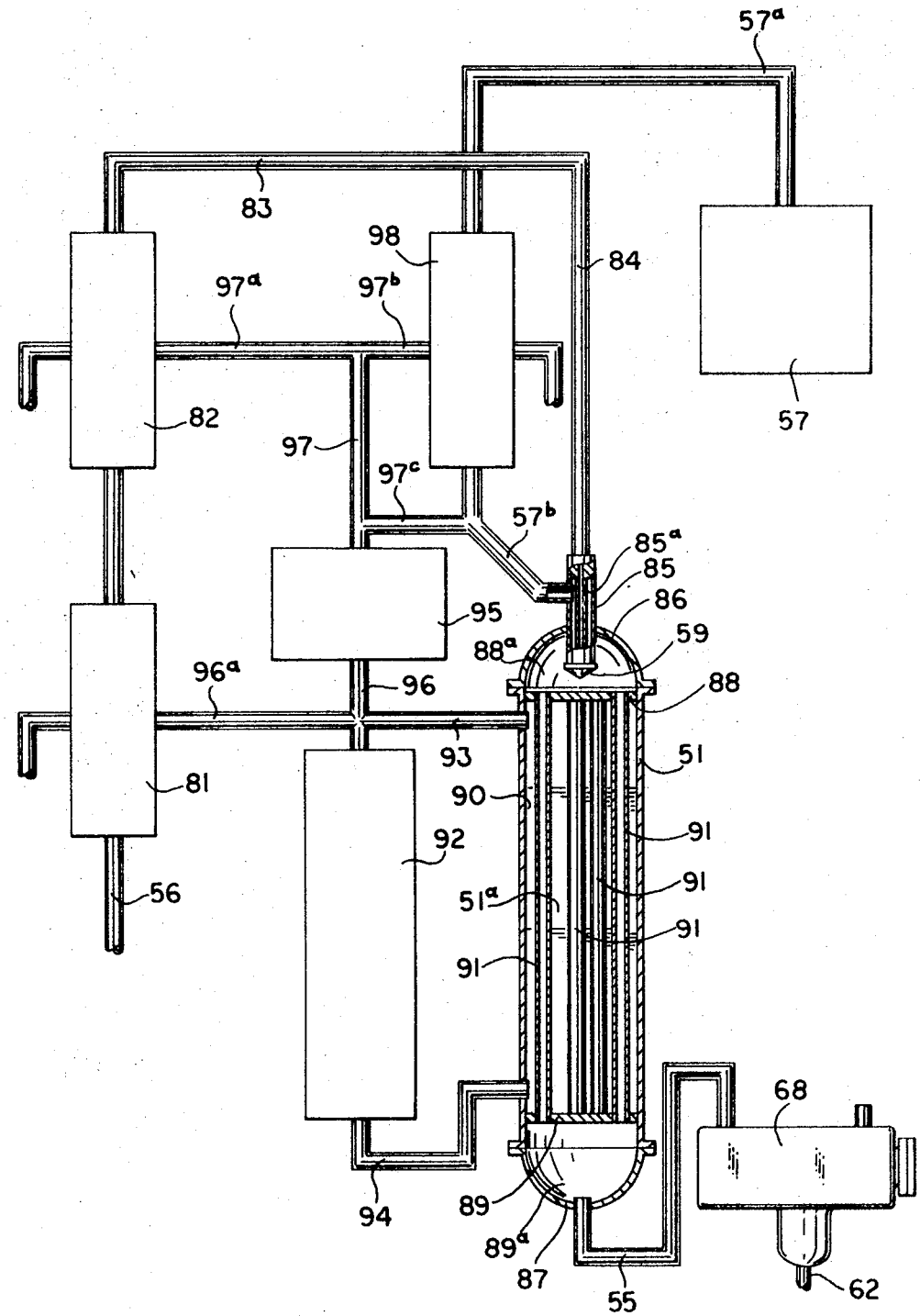

United States Patent Office 3,590,058
Patented June 29, 1971

3,590,058
ATOMIZED HYDROCARBON OXYGENATION REACTION PROCESS AND APPARATUS THEREFOR
Elmer J. LeMaster, Rte. 1, Box 17, Franklin Furnace, Ohio 45629
Continuation-in-part of application Ser. No. 572,288, Aug. 15, 1966. This application June 7, 1968, Ser. No. 735,363
Int. Cl. C08h 17/36
U.S. Cl. 260—413
9 Claims

ABSTRACT OF THE DISCLOSURE

A method is disclosed for the oxygenation of liquid hydrocarbon compounds to fatty acids and other oxygenated compounds by atomizing a preheated and pressurized mixture of the hydrocarbon, steam, and air to a vapor-foam, and passing such vapor-foam mixture through a catalytic bed at a temperature above atmospheric temperature but below the boiling point of the hydrocarbon. The vapor-foam is usually a combination of vapor and foam but may be all foam or substantially all vapor.

Several forms of apparatus are disclosed. In each form disclosed, a reaction vessel is provided having a catalytic bed therein and an atomizer is provided within the vessel in order to form the liquid into a vapor-foam prior to passage through the catalytic bed. In two of the apparatus, the hydrocarbon material, steam, and air enter the reaction vessel, and are atomized near the top thereof and then pass through the catalytic bed and move out of the reaction vessel at the bottom, going from there to an accumulator where the product is settled and separated. In one arrangement, the flow is reversed so that the materials move upward through the reaction vessel. Several types of heat exchangers are shown for preheating the materials to be reacted either utilizing the heat from the reaction (which is normally exothermic) or utilizing hot water or steam.

CROSS REFERENCE TO RELATED APPLICATION

This application is in part a continuation of copending application Ser. No. 572,288 filed Aug. 15, 1966, now abandoned.

BACKGROUND OF THE INVENTION

This invention relates to improvements in the manufacture of oxygenated organic compounds. More particularly, this invention relates to a relatively low temperature, low cost, continuous atomizing process for oxidizing normally liquid acetals, aldehydes, aldols, ethers, esters, cumene, p-cymene, and olefins to alcohols, acids and hydroperoxides.

Various oxidation processes have already been proposed and/or patented wherein the above compounds are oxidized with oxygen or air, either in a liquid phase or vapor phase, using many different well known oxidation catalysts. The liquid phase oxidation process as previously proposed is expensive and is generally considered commercially impractical in view of the large capital investment and production cost due to low conversion rates per unit volume and due to undesirable by-product formation. The vapor phase process is undesirable for a reasonably low temperature oxidation process inasmuch as it is necessary to heat the normally liquid organic compounds to their respective boiling points prior to reaction with oxygen, thus eliminating the selectivity of the oxidation reaction.

Objects

Accordingly, one object of this invention is to provide an improved, safe, efficient process for the conversion of isomeric, straight chain, aromatic, and cyclic hydrocarbon compounds that are normally liquids with a carbon content of five to sixty atoms to provide desirable products.

Another object of this invention is to obtain a commercially accelerated reaction rate while retarding polymerization and condensation reactions, gum formation and other objectionable by-product formation inherent in both the liquid and vapor phase oxidation of the above products.

Another object of the invention is the provision of apparatus for the accomplishment of my improved process.

Further objects and features of my invention will be apparent from the following specification and claims when considered in connection with the accompanying drawings illustrating several embodiments of the apparatus of my invention.

SUMMARY OF THE INVENTION

I have found that the above and other objects may be attained by processes in which the starting materials are introduced in a preheated condition under pressure into the conversion vessel and are there converted into a vapor-foam, and as such, passed through a catalytic bed within such vessel. By "vapor-foam," I mean here and elsewhere in this specification and in the claims "a liquid whch has been changed into a foam or a vapor or a combination thereof."

It is usually a combination of vapor and foam. It may be all foam. Because of the relatively low temperatures used, it is usually not all vapor but may be largely vapor and some foam.

I have found that the objects may be attained by providing a reaction vessel having either a permeable catalytic bed packed therein or a plurality of catalytic tubes surrounded by a temperature control medium; together with means for introducing a mixture of liquid hydrocarbon starting compounds, steam, and oxygen containing gas therein, means for forming the mixture into a semi-stable vapor-foam, and means for passing the vapor-foam through the catalytic bed or tubes.

I have determined by laboratory and pilot plant scale tests that the stated compounds can be oxidized more advantageously by converting such compounds to a "vapor-foam" (as for example) by pumping the preheated starting materials through a high pressure atomizing nozzle at a high velocity with oxygen, or air or other oxygen containing compound and steam that converts the compounds to a highly divided liquid, vapor and/or foam herein designated "vapor-foam," in a reactor of lower pressure, in which the reactor or tubes extending therethrough are filled with active oxidation catalysts such as cobalt, manganese, iron, chromium, vanadium and copper or their compounds or mixtures thereof.

Temperature control at the atomizer outlet or reactor inlet must be maintained, as for example, by preheating the reactor feed material and air being supplied to the reactor and advantageously using superheated steam to supply heat of vaporization and provide heat for the loss of sensible heat due to the atomized fluid expanding at the atomizer outlet from a higher to lower pressure potential. Reactor temperature control may be achieved by providing tubes (packed with catalytic material) within a shell and by surrounding the tubes inside their shell with water, water and steam, or other liquid temperature control medium. To insure complete and safe temperature control, a minimum ratio of 2.5 sq. inches of tube surface per cubic inch of catalyst volume should be provided.

Organic acid salts of Co, Mn, Fe, V, and Cu, mixed in the reactor feed may be substituted for the packed tube catalysts or may be used more advantageously with the packed tube catalysts, especially during reactor start-up and periods during packed tube catalyst deactivation.

The use of steam with oxygen or air is desirable to help atomize, vaporize and/or create a highly divided foam. Steam lowers the partial pressure of the oxygen concentration and reduces or prevents the possibility of an explosive mixture. Steam forms an equilibrium mixture with the products and retards or prevents polymerization and condensation reactions, gum formation and by-product formation. The use of steam with air or oxygen provides a contributory hydrolysis reaction with oxidation that is desirable with most of the stated products. Accelerated reaction rates are achieved with steam in the mixture over a longer active catalyst life. The desirable molar ratio of steam to starting compound varies from 1:1 to 10:1. However, most often it is advantageous to use a molar ratio of 2:1 to 6:1.

The desirable molar ratio of oxygen, (as air, enriched air or oxygen) to starting material should be equimolar to 6:1, depending on the nature of the starting materials and the desirable properties of the reactor effluent. However, in all cases it is advantageous to use an oxygen deficiency to prevent complete oxidation or explosions.

The reactor effluent products may be separated by conventional means such as distillation, fractional crystallization, absorption and decomposition, and the unreacted material may be recycled to the reactor feed.

BRIEF DESCRIPTION OF THE DRAWINGS

FIG. 4 is a view, partially in elevation, partially in section, and partially in block diagram, showing a pilot plant apparatus forming still another embodiment of my invention.

DESCRIPTION OF PREFERRED EMBODIMENTS

Apparatus

Although I believe the processes of my invention are at least as basic as the apparatus embodiments, and it seems that probably the processes are more basic, it appears that a description first of the various forms of apparatus and subsequently the description of the processes will lead more easily and naturally to an understanding of the inventions involved. Therefore, I will first describe the several apparatus disclosed.

Figure 1:
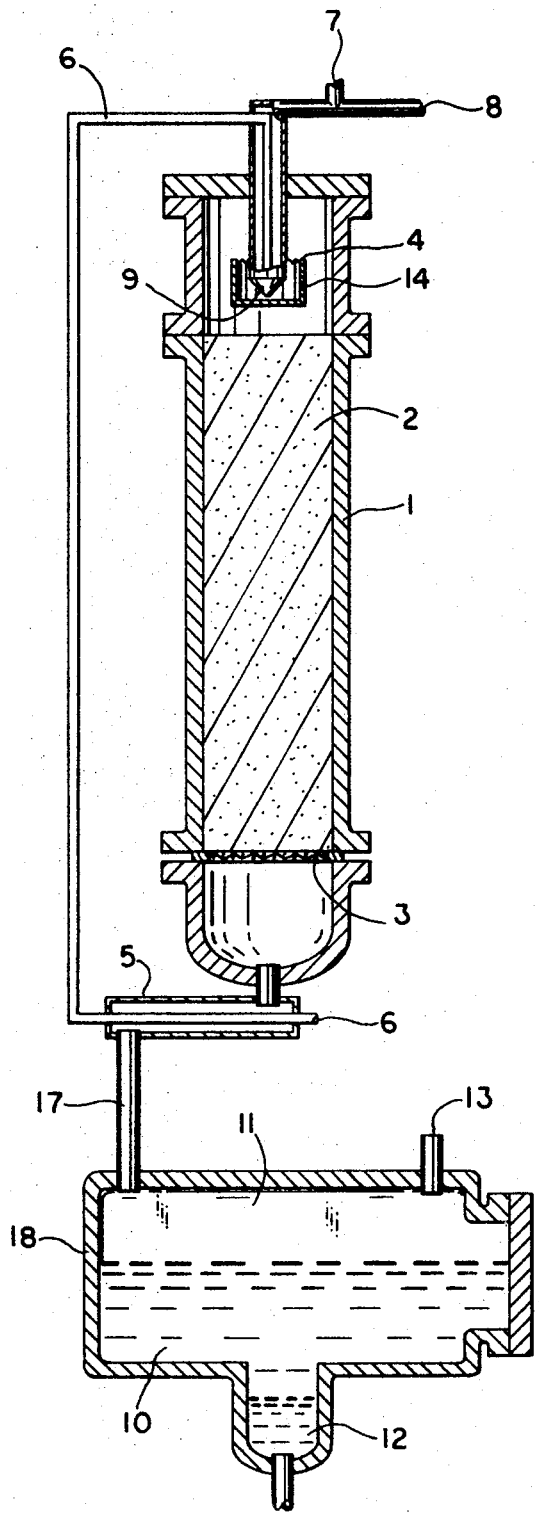
FIG. 1 is a view in vertical section of an apparatus forming one embodiment of my invention.

Referring first to FIG. 1, I have shown there an oxidation reactor or reaction vessel 1, having therein at 2 a fixed bed or beds of cobalt catalyst carried on an inert carrier or support such as pumice, alumina, etc. The catalyst may be more actively promoted with iron, manganese, chromium, vanadium, copper, or their sulfides, sulfates or oxides. The catalyst may be held in place by a grate, grid, and/or screen 3, or other support. This will allow the vapor-foam mixture formed at 4 to pass through the length of the oxidation reactor 2. Therein the starting hydrocarbon materials will be partially oxidized to a higher hydroxyl, acid, and hydroperoxide number. Thus the desired product will pass out through the grate, grid or screen 3 into a heat exchanger 5. Some of the heat of the reaction is given up in the heat exchanger 5 to the incoming hydrocarbon compound in conduit 6 and conducted through the conduit 6 to the inlet of vessel 1, and into the vessel where it is mixed with high pressure air coming in through inlet 7 and steam coming in through inlet 8, and the mixture is converted at the atomizer 9 to vapor-foam which is forced downward through the catalyst bed at 2. The product passes through the screen 3 and then through the outlet conduit 17 into the accumulator 18 where the product is settled and separated into desired product at 10, air and other non-condensables at 11, and steam condensate in the trap or well at 12. The air and other non-condensables are vented through a suitable vent at 13.

Figure 2:
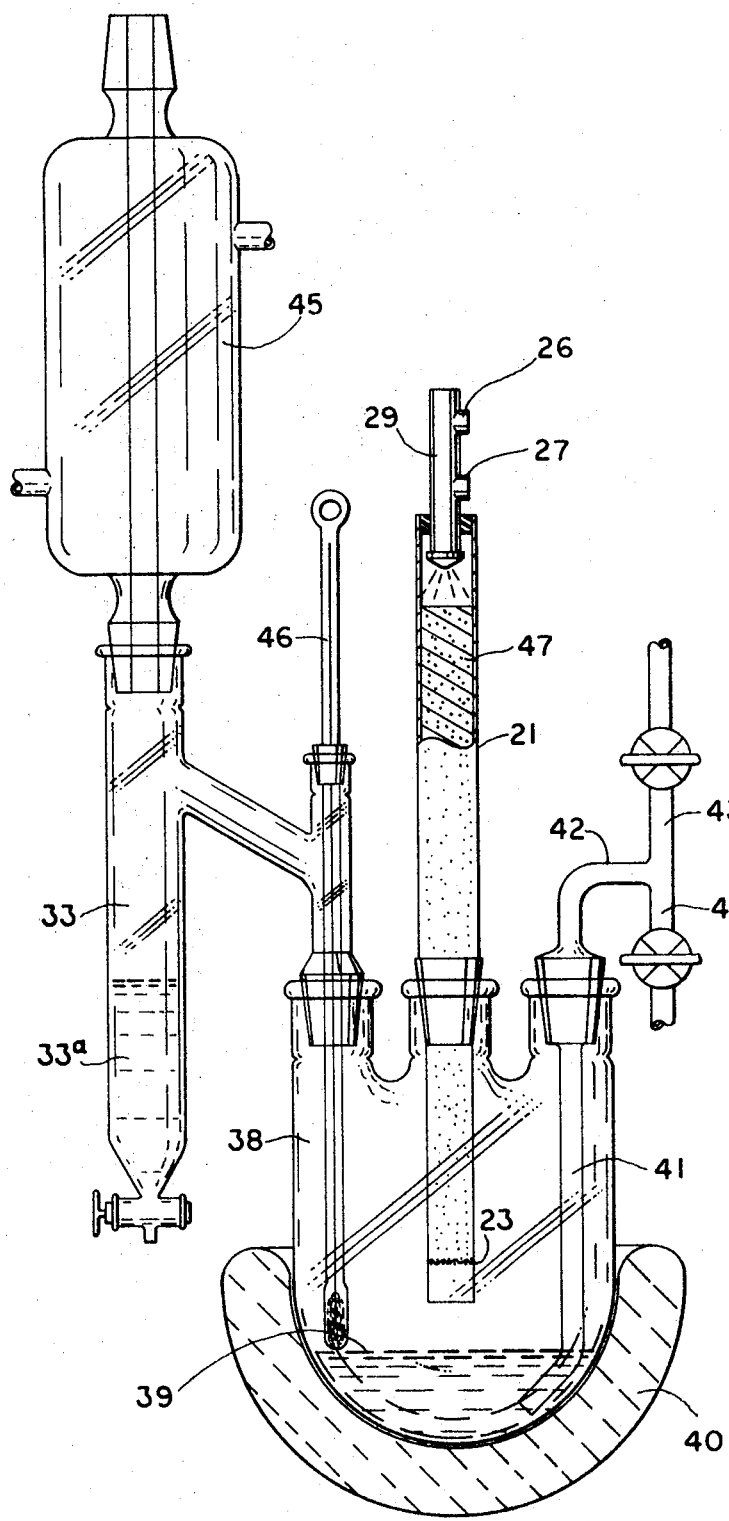
FIG. 2 is a view partially in elevation and partially in vertical section showing a laboratory apparatus forming another embodiment of my invention.
Figure 3:
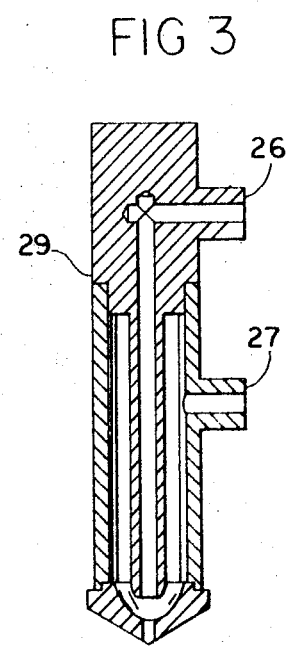
FIG. 3 is a view in vertical section and on a larger scale than FIG. 2 and showing details of the atomizing nozzle of FIG. 2.

In FIGS. 2 and 3, a laboratory embodiment of an apparatus of the invention is shown. Therein an atomizing nozzle 29 is shown. The nozzle 29 has an inlet 26 for heated oil or hydrocarbon which is to be reacted in the apparatus, and a steam and air inlet 27 through which steam and air are introduced under pressure. The lower end of the atomizing nozzle 29 extends into the upper end of a glass oxidation reaction vessel 21. The reaction vessel 21 is substantially filled with an oxidation catalyst which may be either a bed of granulated cobalt or other oxidation catalyst. The oxygenated liquor, after passing through the converter (reaction vessel) passes through screen 23 and then is gathered in an accumulator 38 as at 39 and temperature is maintained by a heating mantle 40. The product is drawn out from accumulator 38 by pumps (not shown) through main conduits or tubes 41 and 42 and branch conduits 43 and 44 respectively, to a recycle operation and to a reservoir for the crude product. Air, water vapor, low boiling products, and non-condensables are forced out through branched fitting 33 and fed into a water condenser 45, wherein the low boiling products and water vapor are condensed and accumulated at the condenser leg 33$^a$. The non-condensables are vented through the top of the condenser. Thermometers or thermocouples 46 and 47 are provided.

In FIG. 4, I have shown, partly diagrammatically, a pilot plant for operation of my invention. Therein, hydrocarbons to be converted are supplied through conduit 56, and then pass through a hot water heat exchanger 81 and a steam heat exchanger 82. For oxidizing some materials, as for example olefins, I have found that one heat exchanger, as for example 81, is sufficient. After passing through the heat exchangers, the hydrocarbons to be reacted are supplied through conduits 83 and 84 to the inner concentric tube 85$^a$ of coaxial conduit 85 and thence through atomizer 59 into the top of oxidation reaction vessel 51. The atomizer 59 is, as shown, practically identical with atomizer 29 of FIG. 2 except that conduit 85, as shown, comes into the top of the atomizer 59 instead of from the side. The vessel 51 is provided with an upper dome 86 and a lower dome 87. It is supplied interiorly of the upper dome 86 with a perforated head plate 88 and interiorly of the lower dome 87 with a perforated head plate 89. Each of the perforations of head plate 88 corresponds with a similar perforation through head plate 89, and tubes 91 connect corresponding perforations in the two plates. The tubes 91 are all packed with granules of catalyst such as cobalt for example or any other mentioned oxidation catalyst. The incoming hydrocarbon which is to be reacted (entering the reaction vessel 51 from conduit 85) goes first through atomizer 59 and then to the space 88$^a$ between upper dome 86 and upper plate 88. The space 51$^a$ in reaction vessel 51 surrounding the tubes 91 is a water jacket (or if desired a jacket for other heat controlling fluid) by which the temperature of the catalyst and of the reacting hydrocarbons in the tubes during reaction is maintained approximately constant at optimum temperature. The water jacket is sealed from the space 88$^a$, from the interior of tubes 91, and from the space 89$^a$, because the ends of the tubes 91 are connected in sealing relationship with all the perforations in heads 88 and 89, and said heads are also sealed to the sides of the vessel 51. For the purpose of maintaining the appropriate temperature, thermostats or other temperature controls are provided. Hot water is constantly circulated from a boiler 92 through conduit 94 and conduit 93 to and from the water jacket portion 51$^a$ of the reaction vessel. Hot water is also supplied from the boiler 92 to steam super heater 95 by means of a conduit 96 which is provided with a branch conduit 96ª supplying steam to heat exchanger 81. Supply conduit 93 is shown extending from conduit 96. From steam superheater 95, a main steam conduit 97 supplies superheated steam and is subdivided into branch conduits 97ª, 97ᵇ, and 97ᶜ. Branch conduit 97ª supplies steam to heat exchanger 82, and conduit 97ᵇ supplies steam to heat exchanger 98 whose purpose will be later described. Conduit 97ᶜ supplies superheated steam to the outer portion of coaxial conduit 85 and thus to space 88ª. An air compressor 57 supplies the air under pressure through conduit 57ª to heat exchanger 98 where the air is heated by the superheated steam. The heated air then passes through conduit 57ᵇ to a Y connection with conduit 97ᶜ and thence to the outer portion of coaxial conduit 85. The heated hydrocarbons, air and steam are mixed in and as they are ejected from the atomizer 59 which could be, if desired, an external mix nozzle. The mixture, after being atomized by atomizer 59, passes into space 88ª, then through the catalyst packed tubes 91, and into space 89ª. The space 89ª is between the lower dome 87 and the lower plate 89. From space 89ª, the reacted product passes through outlet conduit 55 to accumulator 68 where the product is drawn off and separated by any separation and purification process desired.

OPERATION

The operation of the above described apparatus is fully described in the sections of this specification below wherein the processes of my invention are described.

PROCESS

As may be understood from the above, hydrocarbons to be reacted are mixed with superheated steam and with an oxygen containing gas such as air, for example, and then converted to a vapor-foam by any appropriate means as for example, preferably by means of an atomizer. This vapor-foam is introduced into an oxygenating reaction vessel where it passes through the reaction vessel in contact with a suitable catalyst and is there converted to useful compounds by oxidizing the starting materials to a higher hydroxyl, acid and hydroperoxide number.

The oxygenation reaction is normally exothermic, and at times I have found it desirable to cool the materials during reaction, and at other times to heat the reacting materials to maintain a desirable reaction temperature. This may be accomplished by a water jacket such as is shown in FIG. 4. The temperature of the reaction is also controlled by control of the preheat temperature of the incoming hydrocarbon, steam, and air into the reactor, by varying the steam-air-material ratio and by the recycle rate. Steam mixed with air and with the starting material is essential to perform the atomizing step satisfactorily and to create a semi-stable vapor-foam and to achieve a commercially acceptable reaction rate with attendant retardation of polymerization, condensation reactions, gum formation, and other undesirable by-product formation. The other operating variables such as temperature, pressure, air-steam-product ratio, space velocity, etc. depend on the nature of the starting product and the quality of the end product desired. The process is primarily a relatively low temperature and low pressure reaction. The temperature of the reaction mixture should be above atmospheric temperature but below the boiling point of all of the hydrocarbon compounds to be reacted.

Utility

As shown in the examples set out below, I am able to produce iso-octyl alcohol, iso-decyl alcohol, iso-octanoic acid, iso-decanoic acid, aliphatic dibasic acid, mono- carboxylic acids, dihydroxy alcohols, cumene hydroperoxide, p-cymene hydroperoxide, phenol, p-cresol, and acetone. The utility of the above listed products is well known, being used extensively in plastics, paint driers, emulsifiers, plasticizers, synthetic lubricants and solvents.

EXAMPLES

The following examples are presented to illustrate several preferred embodiments of the practice of the process of the invention, it being understood that they are given only by way of illustration and are not to be construed as unnecessarily limiting the scope of the invention covered.

EXAMPLE I

Oxo-aldehydes are formed as an intermediate product in the manufacture of oxo alcohols by oxonation and subsequent hydrogenation of olefins. I have preheated such intermediate products and pumped them at a flow rate of 2 to 4 liters per hour at a pressure of 3 to 15 atmospheres through an atomizing nozzle with steam at a molar ratio of 2:1 to 10:1 and an air flow of 1.7 to 1.9 s.c.f.m. into a reactor (reaction vessel) at a pressure of 1 to 10 atmospheres, the reaction vessel being composed of 19¾" tubes 42" long filled with 1.9 liters of 15% Co and 4% Mn catalysts on alumina or pumice. The reaction vessel was substantially identical with that shown in FIG. 4. In such reaction vessel, the tubes are enclosed in an overall outer shell, the shell being filled with hot water or hot water and stream to allow reactor heat regulation between the optimum temperatures of 110° C. to 180° C. The reaction resulted in an average weight percent conversion of 30% across the reactor to iso-octyl and decyl alcohols and acids. A total conversion of over 70% to alcohols and acids was achieved by recycle of the unreacted product.

I found that higher reactor pressure, flow rate and steam ratio, and a lower reactor temperature favors production of iso-ocytl and decyl alcohols, while the opposite is true for production of iso-actanoic and iso-decanoic acids.

EXAMPLE II

I have similarly treated oxo-polymer bottoms (a waste or by-product of the conversion of oxo-aldehydes to oxo-alcohols by oxonation and subsequent hydrogenation) in a similar vessel. These bottoms were principally acetals, aldol dimers and trimers, esters and ethers and were preheated and pumped at a flow rate of 2 to 4 liters per hour at a pressure of 3 to 15 atmospheres through an atomizing nozzle with stream at a molar ratio of from 2:1 to 10:1 and an air flow of 1.7 to 1.9 s.c.f.m. into a reaction vessel identical with that described in Example I. The reaction resulted in an average conversion of 30% by weight (and by recycling in an average conversion of over 70% by weight) to oxo-alcohols and acids. The same effects of higher reactor pressure flow rate and stream ratio and lower reactor temperature as noticed in Example I were observed.

EXAMPLE III

I have also hydrolyzed and oxidized unsaturated and hydroxylated long chain fatty acids and their esters. The acids and their esters were oxidized by this process (with apparatus identical with that used in Examples I and II) to hydroxylated fatty acids with resultant simultaneous oxidation and chain cleavage to yield aliphatic dibasic and monocarboxylic acids.

Oleic acid, red oil, and vegetable fat or vegetable oil soap stock or "Foots" (a by-product of vegetable oil purification) were preheated and pumped at a flow rate of 1 to 2 liters per hour at a pressure of 3 to 15 atmospheres through the atomizing nozzle with stream at a molar ratio of 2:1 to 6:1 and an air flow of 1.7 to 1.9 s.c.f.m. into the same reactor at a pressure of 1 to 10 atmospheres with the same catalyst as in Examples I and II with a reactor temperature of 120° C. to 200° C. resulting in an effluent averaging 5 to 15 weight percent conversion to aliphatic dibasic and monocarboxylic acids, depending on the purity or percent unsaturation of the starting compounds. However, this atomized oxidation process is more advantageously used by having the oxidation reaction take place in two stages, wherein the unsaturated fatty acids or their esters in the first stage are oxidized by this process using the higher pressures, steam ratio and liquid flow rate, and using lower temperatures, resulting in hydroxylated fatty acids that are separated and pumped to the second stage oxidation reactor with resultant simultaneous oxidation and chain cleavage to yield copious amounts of dibasic $C_8$ and $C_9$ acids with the amounts of $C_9$ and lower monocarboxylic acids de- depending on the purity or percent unsaturation of the compound. The lower pressure, steam ratio and liquid flow rate with the higher reaction temperature in the second stage, favors the second stage oxidation reaction.

EXAMPLE IV

I oxidized olefins with various isomers of different configuration and branching and with a carbon atom content of seven to twenty by this process with the apparatus used in Example I to dihydroxy alcohols with simultaneous oxidation and chain cleavage to yield monocarboxylic acids with a carbon atom content of two to nineteen.

This process was also more advantageously used by the oxidation reaction taking place in two stages. Mixed nonenes, being used as an example, are preheated and pumped at a pressure of 3 to 15 atmospheres at a flow rate of 1 to 3 liters per hour through the atomizing nozzle with steam at a molar ratio of 2:1 to 4:1 and an air flow of 1.7 to 1.9 s.c.f.m. into the reactor at a pressure of 1 to 10 atmospheres and a reaction temperature of 120° C. to 200° C., resulting in a first stage effluent averaging 15 to 20 weight percent conversion to dihydroxy alcohols by using in such first stage the higher pressure, steam ratio and liquid flow rate with the lower temperature.

The dihydroxy alcohols were separated from the first stage effluent and pumped to the second stage reactor where the lower pressure, steam ratio and liquid flow rate were used with higher reaction temperature, resulting in over 80% total conversion to $C_2$ through $C_8$ monocarboxylic acids, provided unreacted effluent from each oxidation stage be recycled.

EXAMPLE V

Cumene and p-cymene were oxidized by this process to yield cumene and p-cymene hydroperoxide respectively. These products may be decomposed to phenol, p-cresol and acetone by well known commercial decomposition techniques.

Cumene, as an example, was preheated and pumped at a pressure of 7 to 15 atmospheres at a flow rate of 1 to 2 liters per hour through an atomizing nozzle with steam at a molar ratio of 2:1 to 4:1 and an air flow of 1.7 to 1.9 s.c.f.m. into a reactor at a pressure of 4 to 7 atmospheres, composed of 7¾" copper tubes 10' long packed with copper gauze or copper wool. The tubes were enclosed in a shell, filled with hot water or hot water and steam, to allow reactor heat regulation between the optimum temperature of 110° C. to 125° C. The process resulted in an effluent of 16 to 25 weight percent conversion to cumene hydroperoxide. Optimum total conversion was achieved by the recycle of the unreacted cumene and more advantageously by recycling with the unreacted cumene 2 to 3% of cumene hydroperoxide to help initiate and accelerate the oxidation reaction.

It is to be understood that while the detailed drawings and specific examples given describe preferred embodiments of my invention, they are for the purpose of illustration only, that the apparatus of the invention is not limited to the precise details disclosed, that the process of the invention is not limited to precise conditions disclosed, and that various changes may be made therein without departing from the spirit and scope of the invention which is defined by the following claims.

I claim:
1. A process for oxygenation of hydrocarbon compounds to fatty acids and other oxygenated products comprising:
   (1) mixing liquid hydrocarbon compounds with an oxygen containing gas and steam under pressure;
   (2) atomizing the mixture into a reaction vessel having no liquid level whereby the mixture is converted into a finely divided liquid and vapor and into a relatively low temperature semi-stable vapor-foam; and
   (3) passing said vapor-foam mixture through a catalytic bed.
2. The process of claim 1 where the hydrocarbons and oxygenated derivatives thereof are selected from the group consisting of acetals, aldehydes, aldols, cumene, ethers, esters, cumene, olefins, and unsaturated long chain fatty acids, and where the oxygen containing gas is air.
3. The process of claim 1,
where the mixture is formed into a vapor-foam by an atomizing step.
4. The process of claim 1,
where the catalytic bed is a fixed bed of catalyst supported by an inert carrier.
5. The process of claim 1,
where the catalytic bed is a packed tube of catalyst supported by an inert carrier.
6. The process of claim 1,
where the catalyst of the catalytic bed is selected from the group consisting of cobalt, manganese, iron, chromium, vanadium, copper, their compounds and mixtures thereof.
7. The process of claim 1,
where the product of the oxygenation process is, subsequent to passing through the catalytic bed, passed through a heat exchange process wherein heat produced in the exothermic reaction of oxygenation is returned to the process to supply initial heat to the incoming mixture of hydrocarbons, oxygen containing gas, and steam; and
where the product subsequent to passing through the heat exchanging step is settled and separated into the fatty acids and related products on the one hand, and air, other non-condensables, and steam condensate on the other hand.
8. A process for oxygenation of hydrocarbon compounds to fatty acids and related products comprising:
   (1) mixing liquid hydrocarbons and oxygenated derivatives thereof selected from the group consisting of acetals, aldehydes, aldols, cumene, ethers, esters, cymene, olefins, and unsaturated long chain fatty acids, with air and steam under pressure;
   (2) atomizing the mixture into a reaction vessel having no liquid level whereby the mixture is converted into a finely divided liquid and vapor and into a relatively low temperature semi-stable vapor-foam;
   (3) passing said vapor-foam mixture through a fixed catalytic bed supported by an inert carrier at a temperature of about 80° C. to about 200° C.;
   (4) passing the product through a heat exchange process whereby heat produced in the exothermic reaction of oxygenation is returned to the process to supply initial heat to the incoming mixture of hydrocarbons, air and steam; and
   (5) subsequent to passing the product through the heat exchanging step, settling and separating the product into crude product acids on the one hand and air, other non-condensables, and steam condensate on the other hand.
9. The process of claim 8, in which the catalytic bed is formed of a catalyst selected from the group consisting of cobalt, manganese, iron, chromium, vanadium, copper, their compounds, and mixtures thereof.

References Cited

UNITED STATES PATENTS

| 3,104,263 | 9/1963 | Reimenschneider | 260—604 |
| 3,156,642 | 11/1964 | Trantham et al. | 208—120 |

FOREIGN PATENTS

| 493,520 | 6/1953 | Canada | 260—413 |

OTHER REFERENCES

Lebedeva et al., Chem. Abstracts, vol. 63, 1965, 9722f.
Wo-E Ku et al., Chem. Abstracts, vol. 61, 1964, 5430C.

LEWIS GOTTS, Primary Examiner

E. G. LOVE, Assistant Examiner

U.S. Cl. X.R.

23—263, 288; 260—530, 531, 533, 537, 540, 610, 621, 635, 638

PO-1050
(5/69)

UNITED STATES PATENT OFFICE
CERTIFICATE OF CORRECTION

Patent No. 3,590,058                     Dated July 29, 1971

Inventor(s)    Elmer J. LeMaster

It is certified that error appears in the above-identified patent and that said Letters Patent are hereby corrected as shown below:

Column 2, line 29 should read ... a liquid which ...;

" 6, " 18 should read ... of 19 3/4" tubes... rather than ... $19^3/4$" tubes...;

" 6, " 34 should read ... iso-octanoic... rather than iso-actanoic;

" 6, " 45 should read...with steam... rather than "with stream";

" 6, " 52 should read ... steam ratio... rather than "stream ratio";

" 6, " 67 should read... with steam ... rather than "with stream";

" 7, line 57 should read ... 7 3/4" copper tubes... rather than "$7^3/4$" copper tubes".

Signed and sealed this 4th day of January 1972.

(SEAL)
Attest:

EDWARD M. FLETCHER, JR.           ROBERT GOTTSCHALK
Attesting Officer                 Acting Commissioner of Patents